United States Patent [19]

Miyamoto

[11] Patent Number: 5,730,379
[45] Date of Patent: Mar. 24, 1998

[54] RECORDING-MEDIUM CARTRIDGE LOADING DEVICE

[75] Inventor: Takashi Miyamoto, Tokyo, Japan

[73] Assignee: Teac Corporation, Tokyo, Japan

[21] Appl. No.: 644,980

[22] Filed: May 15, 1996

[30] Foreign Application Priority Data

May 18, 1995 [JP] Japan .................... 7-120098

[51] Int. Cl.$^6$ .................................................. G11B 15/60
[52] U.S. Cl. .................................................. 242/338
[58] Field of Search .......................... 242/336, 338, 242/338.2, 338.4, 340, 352.4; 360/94, 96.5

[56] References Cited

U.S. PATENT DOCUMENTS

| | | | |
|---|---|---|---|
| 4,556,923 | 12/1985 | Olmsted | 360/96.5 |
| 4,622,606 | 11/1986 | Rudi | 360/96.5 |
| 5,237,469 | 8/1993 | Kukreja et al. | 360/96.5 |
| 5,267,706 | 12/1993 | Vollmann | 242/338 |
| 5,485,326 | 1/1996 | Chiou et al. | 242/338.2 |
| 5,543,993 | 8/1996 | Argumendo et al. | 360/96.5 |
| 5,558,291 | 9/1996 | Anderson et al. | 242/336 |

FOREIGN PATENT DOCUMENTS

| | | |
|---|---|---|
| 4-20650 | 2/1992 | Japan . |
| 4-90040 | 8/1992 | Japan . |

*Primary Examiner*—John P. Darling
*Attorney, Agent, or Firm*—Michael N. Meller

[57] ABSTRACT

A door opening member automatically opens a door of a recording-medium cartridge in an operation position thereof as the recording-medium cartridge is loaded in a loading device. A maintaining and retreating mechanism maintains the door opening member in the operation position when the door opening member opens the door of the recording-medium cartridge. The maintaining and retreating mechanism allows the door opening member to retreat from the operation position after the door opening member has opened the door of the recording-medium cartridge.

3 Claims, 21 Drawing Sheets

FIG. 3
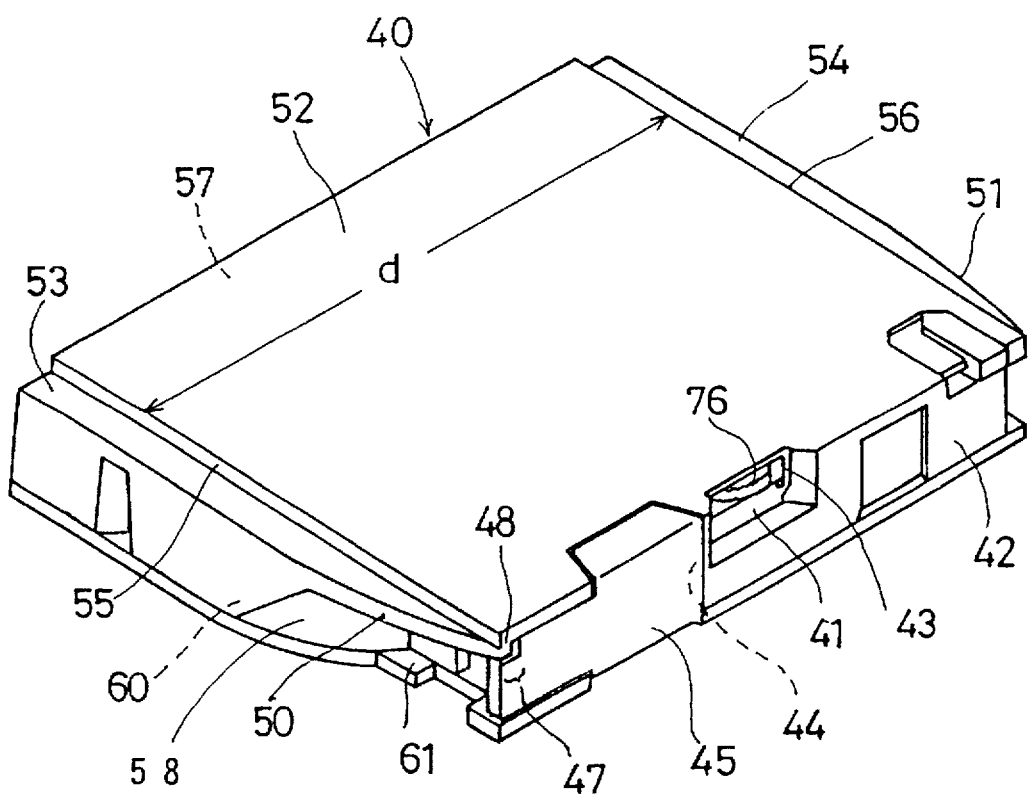
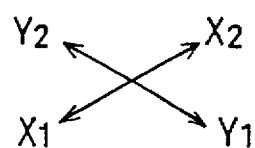

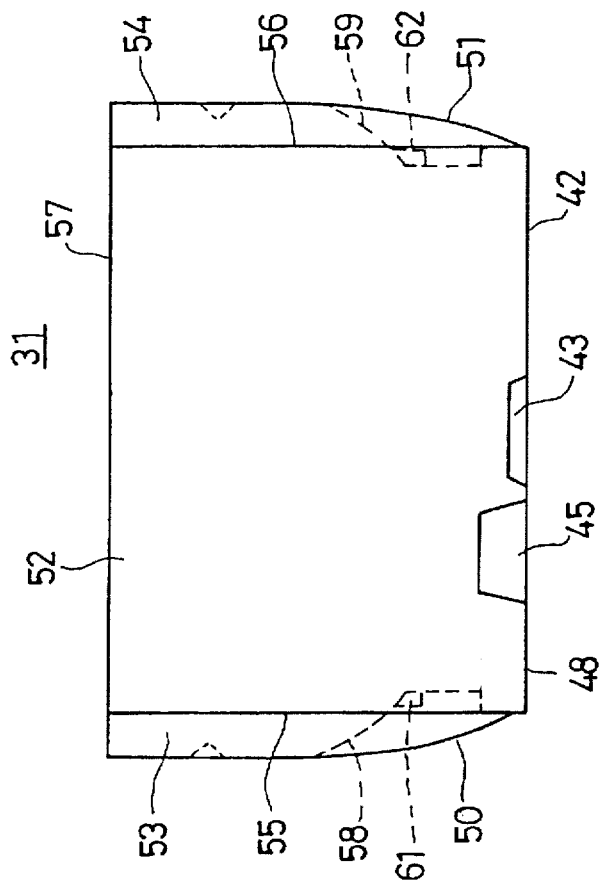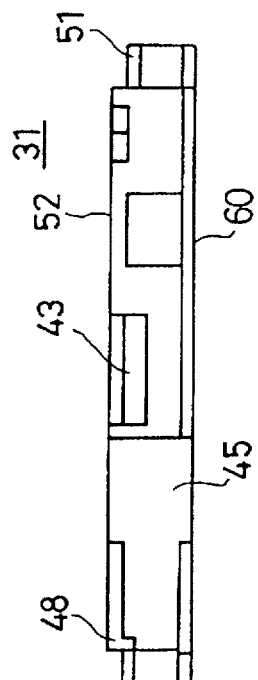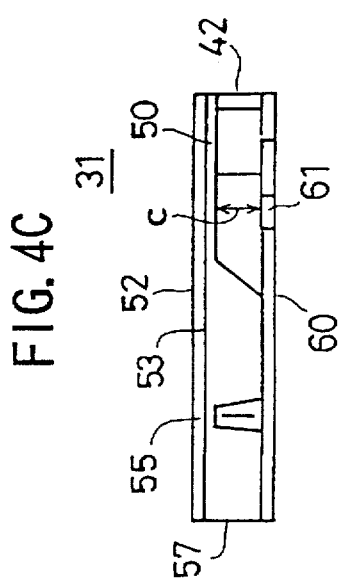
FIG. 4A
FIG. 4B
FIG. 4C

FIG. 5
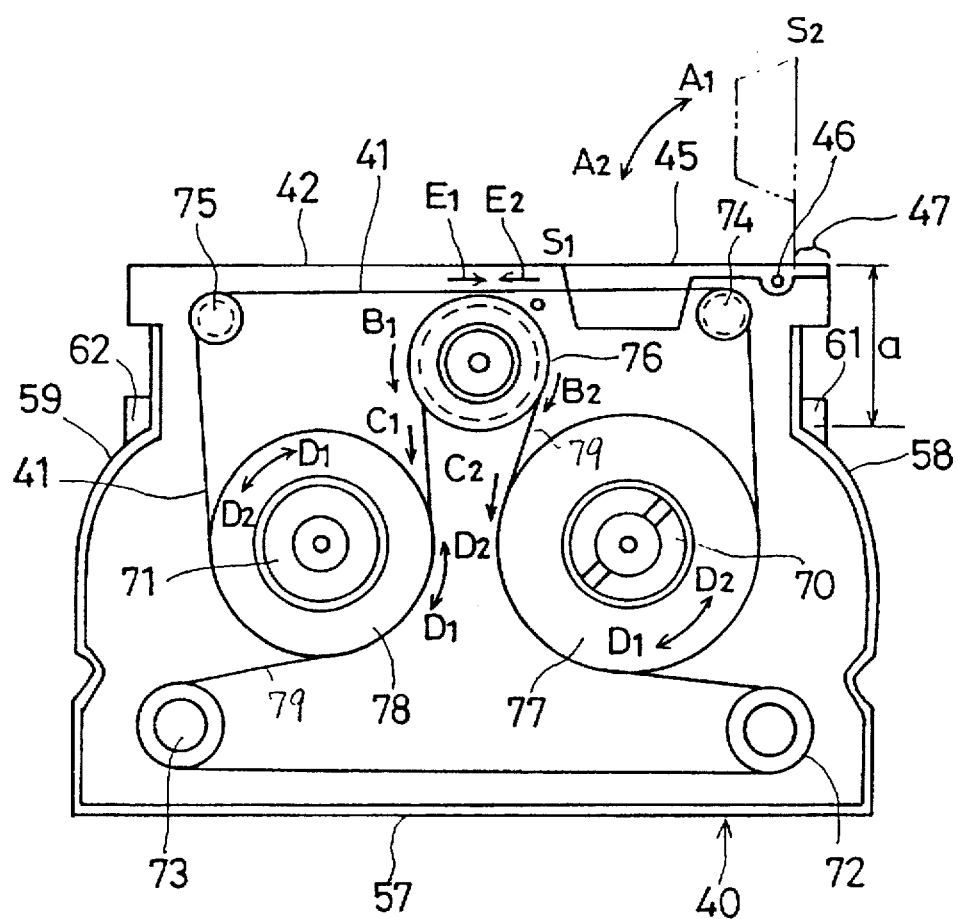
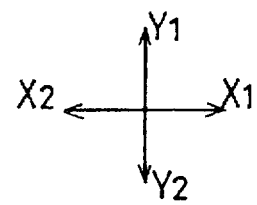

5,730,379

RECORDING-MEDIUM CARTRIDGE LOADING DEVICE

BACKGROUND OF THE INVENTION

1. Field of the Invention

The present invention is related to a recording-medium cartridge leading device, and particularly to the device in which a recording-medium cartridge having a door is inserted and loaded.

In the device in which a recording-medium cartridge is inserted and loaded, in order that the recording-medium cartridge having a door is stably loaded, it is important that the door is opened at an earlier step during a process in which the recording-medium cartridge is inserted.

2. Description of the Related Art

FIG. 1 shows an example of a recording-medium cartridge loading device in the related art. In a tape recorder 10, a door opening member 11 is fixed to face an insertion opening 12.

A magnetic-tape cartridge 20 has a door 21 at the front thereof, is inserted in a Y1 direction, has the door 21 thereof opened by the door opening member 11 as a result of being pressed by the door opening member 11, and thus is loaded in the tape recorder 10.

However, the recording-medium cartridge loading device in the related art is not suitable for a type of a magnetic tape cartridge which has a portion sideways extending from the side edge of the door 21. In fact, in order to prevent the sideways extending portion from coming into contact with the door opening member 11, it is necessary to position the door opening member 11 at a rearward shifted position. If the door opening member 11 is positioned at a rearward shifted position, a timing when the door 21 is opened through the door opening member 11 is delayed accordingly, thus the door 21 may come into contact with a magnetic head 13 and thereby the door 21 may not opened.

SUMMARY OF THE INVENTION

An object of the present invention is to provide a recording-medium cartridge loading device which solves the above-mentioned problem.

A recording-medium cartridge loading device, according to the present invention, for a recording-medium cartridge having a door to be loaded therein, comprises:

a door opening member for automatically opening the door of the recording-medium cartridge in an operation position thereof by an action of the recording-medium cartridge being loaded in the loading device; and maintaining and retreating means for maintaining the door opening member in the operation position when the door opening member opens the door of the recording-medium cartridge, said maintaining and retreating means allowing the door opening member to retreat from the operation position after the door opening member has opened the door of the recording-medium cartridge.

It is preferable that the maintaining and retreating means has a pressed member which is pressed by a predetermined portion of the recording-medium cartridge when the recording-medium cartridge is inserted in the loading device, such that the predetermined portion of the recording-medium cartridge presses the pressed member so that the door opening member retreats from the operation position.

Further, it is preferable that the maintaining and retreating means has a bearing member for bearing a load occurring when the door opening member opens the door of the recording-medium cartridge, the bearing member being pressed by a predetermined portion of the recording-medium cartridge after the door opening member has opened and thereby allowing the door opening member to retreat from the operation position.

Thereby, during a process in which the recording-medium cartridge is inserted into and thus loaded in the loading device, the bearing member (pressed member) of the maintaining and retreating means bears a load applied to the door opening member when the door opening member opens the door of the cartridge. After the door of the cartridge has been completely opened by the door opening member, the bearing member (pressed member) is then pressed by the predetermined portion of the cartridge. Thereby, the bearing member moves to a position such that the bearing member cannot bear a load applied by the predetermined portion of the cartridge and thus the door opening member cannot help retreating from the operation position thereof.

Thus, because the bearing member (pressed member) is arranged so as to be pressed by the predetermined portion of the cartridge and thereby causes the door opening member to be not able to help retreating from its operation position, the retreating operation of the door opening member can be smoothly, stably performed. Because the door opening member thus retreats from its operation position appropriately, further insertion of the cartridge into the loading device can be then smoothly, stably and thus reliably performed without being obstructed by the door opening member. Furthermore, because the door opening member thus retreats appropriately, it is possible to arrange the door opening member in a position such that the door opening operation can be performed at an early step of the cartridge inserting/loading process. Thereby, it is possible to open the door early so that it can be prevented that the door comes into contact with a magnetic head or the like.

Other objects and further features of the present invention will become more apparent from the following detailed description when read in conjunction with the accompanying drawings.

BRIEF DESCRIPTION OF THE DRAWINGS

FIG. 3 shows a perspective view of a magnetic-tape cartridge which is loaded in the magnetic-tape cartridge loading device shown in FIG. 2;

FIGS. 4A, 4B and 4C show a plan view, a front view and a side elevational view of the magnetic-tape cartridge shown in FIG. 3;

FIG. 5 shows an internal plan view of the magnetic-tape cartridge shown in FIG. 3;

DETAILED DESCRIPTION OF THE PREFERRED EMBODIMENT

Figure 2:
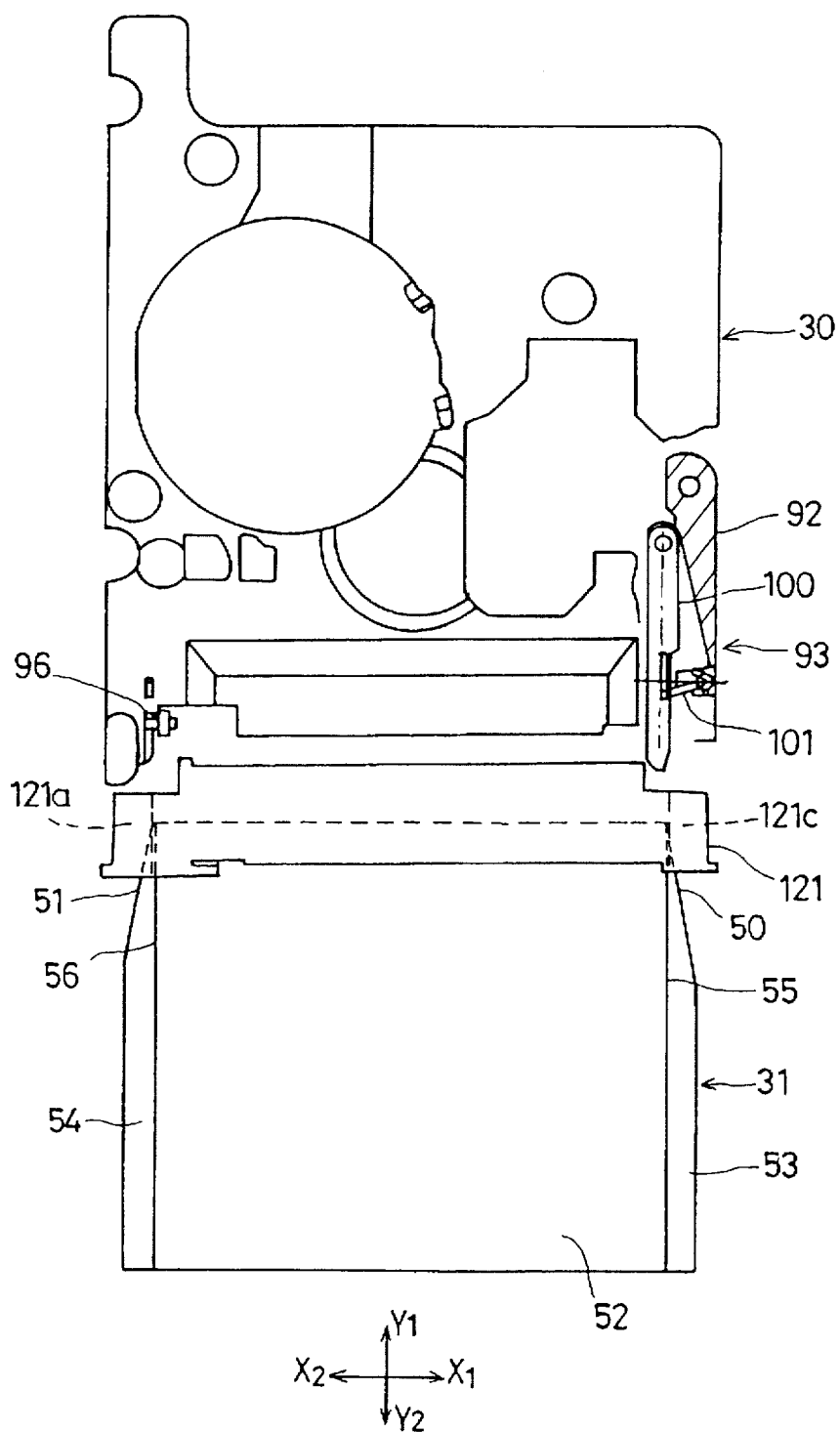
FIG. 2 shows a plan view of a tape recorder in an embodiment of a magnetic-tape cartridge loading device according to the present invention.

FIG. 2 shows a magnetic-tape cartridge loading device in an embodiment of the present invention. A tape recorder 30 has a magnetic-tape cartridge 31 loaded therein and operates for use of backup of a hard disc device.

A structure of the magnetic-tape cartridge 31, a structure of the tape recorder 30 and an operation of the loading of the magnetic-tape cartridge 31 in the tape recorder 30 are described in the above order.

Structure of the Magnetic-Tape Cartridge

As shown in FIGS. 3, 4A, 4B, 4C and 5, the magnetic-tape cartridge 31 has a structure that, in general, a magnetic tape 41 is contained in a cartridge body 40.

The cartridge body 40 has an opening window 43 at a center of a front surface 42 (the term 'front' and so forth being based on a direction, in which the magnetic-tape cartridge 31 is inserted, used as a reference direction, hereinafter) and another opening window 44 at a position to the right edge (X1-direction end) of the front surface 42. A door 45 is provided for the opening window 44. The door 45 is supported by the cartridge body 40, and is located at an S1 position (shown in FIG. 5) ordinarily as a result of having a force thereon applied by a spring and thus covers the opening window 44. During a process of loading to be described later, the door 45 is rotated in a direction A1 shown in FIG. 5, reaches an opened position S2 indicated in the figure by a chain double-dashed line, and thus is opened. The door 45 has an arm portion 47 extending in the direction X1 from a rotation shaft 46.

Further, the cartridge body 40 has a pressing portion 48 at a position at the right edge (X1-direction end) of the front surface 42 as shown in FIG. 3.

A top plate 52 of the cartridge body 40 has an extending portion 50 at the X1 end thereof, and has an extending portion 51 at the X2 end thereof as shown in FIG. 4A. The extending portions 50 and 51 start from the two side ends of the front surface 42, and gradually sideways extend as shown in the figure. Thus, the extending portions 50 and 51 taper to the front surface 42 as shown in the figure.

Further, the cartridge body 40 has lower surfaces 53 and 54, lower than the top surface of the top plate 52, at the X1 and X2 sides of the top plate 52. Between the top surface of the top plate 52 and the lower surfaces 53, 54, vertical inter-step surfaces 55 and 56 are formed, extending in parallel in a Y2 direction from the two side ends of the front surface 42 and reach a rear surface 57 of the cartridge body 40.

Further, as shown in FIG. 5, the cartridge 40 has approximately arc-shaped side walls 58 and 59 at the X1 and X2 ends. These arc-shaped side walls 58 and 59 start from a position, in the Y2 direction, shifted a dimension 'a' from the front surface 42. The cartridge body 40 has lugs 61 and 62 sideways extending from a bottom plate 60 of the cartridge body 40 at the positions at which the side walls 58 and 59 start, as mentioned above.

As shown in FIG. 5, in the cartridge body 40, a pair of reels 70 and 71, a pair of guide rollers 72 and 73, a pair of tension rollers 74 and 75, and a roller 76, are arranged in a manner in which the arrangement is right and left symmetrical. Further, each of the reels and rollers is rotatably supported on a rotation-axis shaft. The roller 76 is adjacent to the opening window 43.

The magnetic tape 41 is wound on the reels 70 and 71, and thus forms magnetic tape winding bodies 77 and 78. Further, the magnetic tape 41 is guided by the pair of tension rollers 74 and 75 and thus passes through a path along the front surface 42 of the cartridge body 40.

A belt 79 is hung between the three rollers 76, 72 and 73, and parts thereof are wound on the magnetic tape winding bodies 77 and 78 as shown in FIG. 5.

With reference to FIG. 5, when the roller 76 turns in a direction B1, the belt 79 runs in a direction C1, the magnetic tape winding bodies 77 and 78 turn in a direction D1, and the magnetic tape 41 runs in a direction E1 along the front surface 42 of the cartridge body 40. Reversely, when the roller 76 turns in a direction B2, the belt 79 runs in a direction C2, the magnetic tape winding bodies 77 and 78 turn in a direction D2, and the magnetic tape 41 runs in a direction E2 along the front surface 42 of the cartridge body 40.

Structure of the Tape Recorder 30

As shown in FIGS. 2, 6, 7, 8 and 9, in the tape recorder 30, in a case formed by a chassis 90, a front bezel 91, a rectangular-shaped frame 92, a door opening mechanism 93, a tape driving mechanism 94, a magnetic head 95, a magnetic-tape cartridge guiding mechanism 96, a magnetic-tape cartridge positioning mechanism 97, and so forth, are provided.

Structure of the Door Opening Mechanism 93

As shown in FIGS. 10A, 10B, 10C, 11, 6, 8 and 9, the door opening mechanism 93 is provided at a position toward the X1 side and also toward the Y2 side (the front bezel 91 side), and includes a door opening member 100, a crank arm 101 and a torsion coil spring 102, in general.

Figure 6:
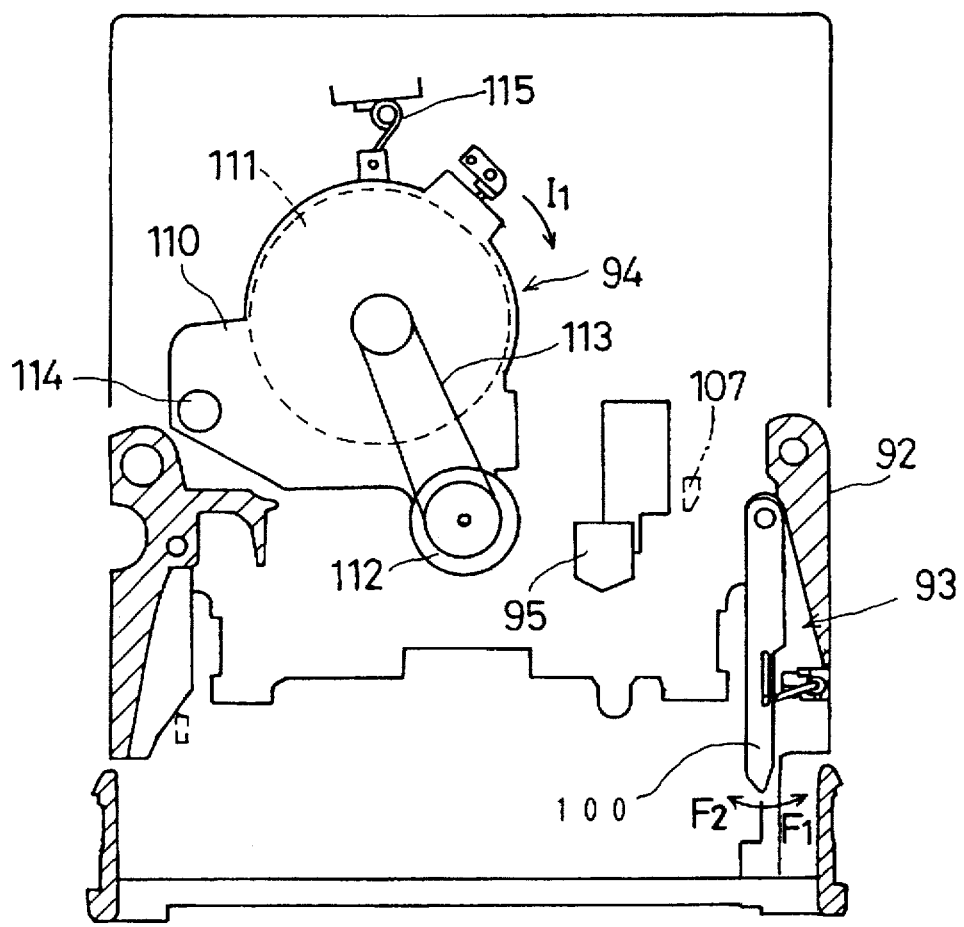
FIG. 6 shows a plan view of the tape recorder shown in FIG. 2, in a condition where an upper chassis and an upper frame have been removed therefrom.

The door opening member 100 has a shape of a rod with a rectangular cross section, has a rotation-axis shaft 100a at the Y1-direction end thereof, has a tapering edge portion 100b at the Y2-direction end, and has at a center thereof a long hole 100c extending along the longitudinal direction thereof. The shaft 100a of the door opening member 100 is inserted in a hole 103 of the frame 92 and is thus supported on the frame 92 rotatably about the shaft 100a. The door opening member 100 extends along the Y2 direction and is rotatable in F1 and F2 directions, as shown in FIG. 6. A vertical dimension b, shown in FIG. 10A, of the door opening member 100 is shorter than a distance c, shown in FIG. 4C, between the extending portion 50 and the lug 61.

Figure 10A:
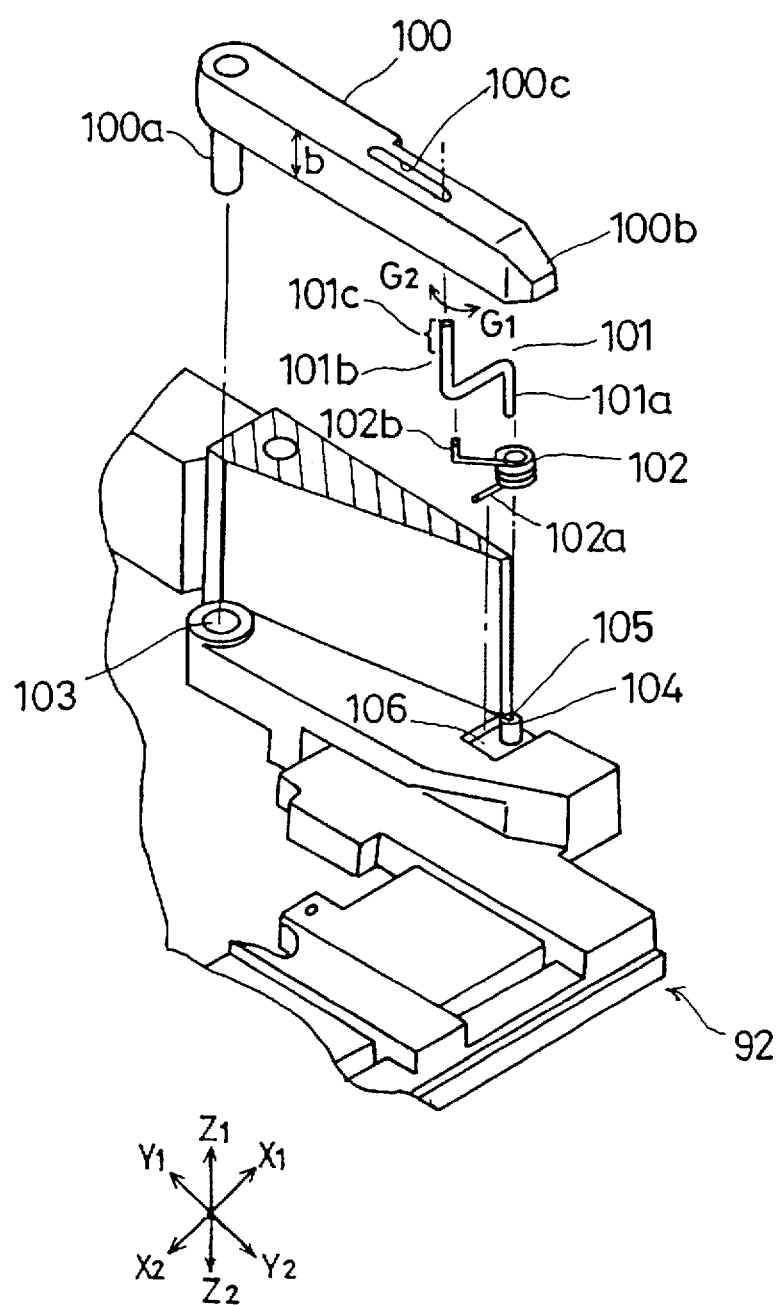
FIG. 10A shows an exploded perspective view of a door opening mechanism of the tape recorder shown in FIG. 2.
Figure 10B:
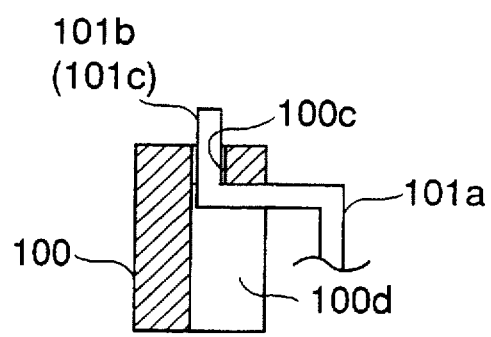
FIG. 10B shows a front elevational cross-sectional view of a door opening member and a crank arm after cutting off a front part of the door opening member along a vertical plane passing through a long hole formed in the door opening member, showing an arrangement of a cut-out portion.
Figure 10C:
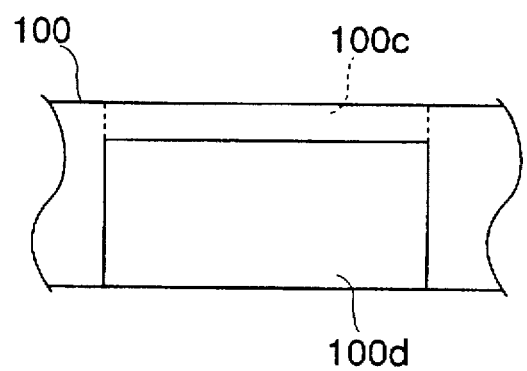
FIG. 10C shows a partial side elevational view of the door opening member showing a length of the cut-out portion.

Further, the door opening member 100 has a cut-out portion 100d, shown in FIGS. 10B and 10C. The cut-out portion 100d extends as long as the long hole 100c extends, as shown in FIG. 10C, such that a middle horizontal portion of the crank arm 101 can move in the cut-out portion 100d throughout the full length of the long hole 100c.

The crank arm 101 has a crank shape and has a downward arm portion 101a and an upward arm portion 101b at the two ends thereof, respectively. The downward arm 101a is fitted to a hole 105 of a boss 104 of the frame 92, and thus the crank arm 101 is rotatably supported on the frame 92. The upward arm portion 101b passes through the long hole 100c of the door opening member 100 from the bottom thereof. An upper portion of the upward arm portion 101b is referred to as a pressed portion (acting as a bearing member) 101c which is a portion of the upward arm portion 101b projecting from the top surface of the door opening member 100. The pressed portion 101c (upward arm portion 101b) moves in an arc U shown in FIG. 11 about the downward arm portion 101a as a center axis of the arc-U movement.

The torsion coil spring 102 is fitted over the outer surface of the boss 104, a one-end arm portion 102a thereof is held by a side wall of a depression 106 of the frame 92, and an other-end arm portion 102b thereof is held by a middle portion of the crank arm 101. By using the torsion coil spring 102, the crank arm 101 has a force applied thereto such that the force tends to cause the crank arm 101 to turn in a G1 direction about the downward arm portion 101a of the crank arm 101.

Figure 11:
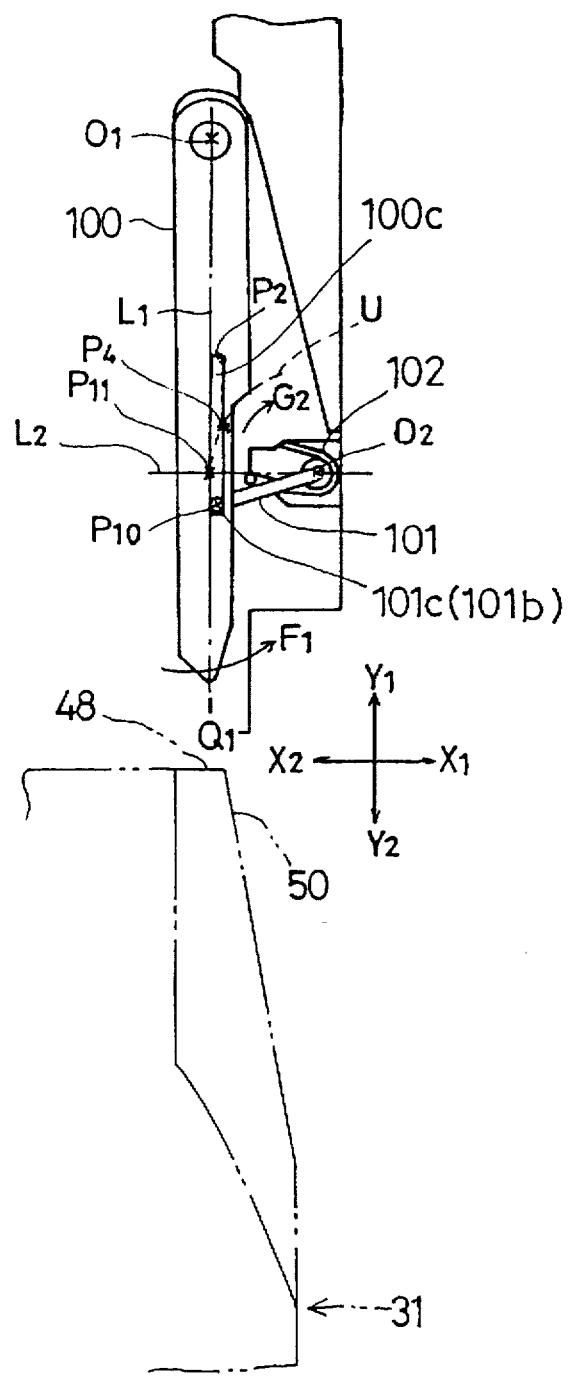
FIG. 11 shows a plan view of the door opening mechanism in an initial state.

The door opening mechanism 93 is at a position shown in FIG. 11 initially. The pressed portion 101c (the upward arm portion 101b) is located at a position P10 at the Y2-direction end of the long hole 100c. With reference to FIG. 11, the door opening member 100 is positioned at a rotation position Q1 such that an axis line L1 which passes through a rotation axis center O1 of the door opening member 100 extends along the Y1-Y2 direction. This position of the door opening member 100 will be referred to as an operation position, hereinafter.

A line which passes through a rotation axis center O2 of the crank arm 101 and extends perpendicular to the above-mentioned line L1 is referred to as L2. A point at which the two lines L1 and L2 cross one another is referred to as P11. A position shifted in the Y2 direction from the point P10 and also at the Y2-direction end of the long hole 100c is referred to as P10. In this arrangement, when the pressed portion (upward arm portion 101b) is located at the position P10 at the Y2-direction end of the long hole 100c, even if a force in the X1 direction is applied to the pressed portion, the crank arm 101 can turn neither in the G1 direction nor in the G2 direction. Accordingly even when a strong force is applied to the door opening member 100 in the F1 direction (direction to a retreat position Q2), the door opening member 100 cannot turn.

As a result, the door opening member 100 is maintained to be at the operation position Q1. The operation position Q1 is a position such that the edge portion 100b of the door opening member 100 rightly comes into contact with the arm portion 47 of the door 45 of the magnetic-tape cartridge 31 being inserted into the tape recorder 30. The crank arm 101, torsion coil spring 102, long hole 100c and position of them form maintaining/retreating means.

Figure 19:
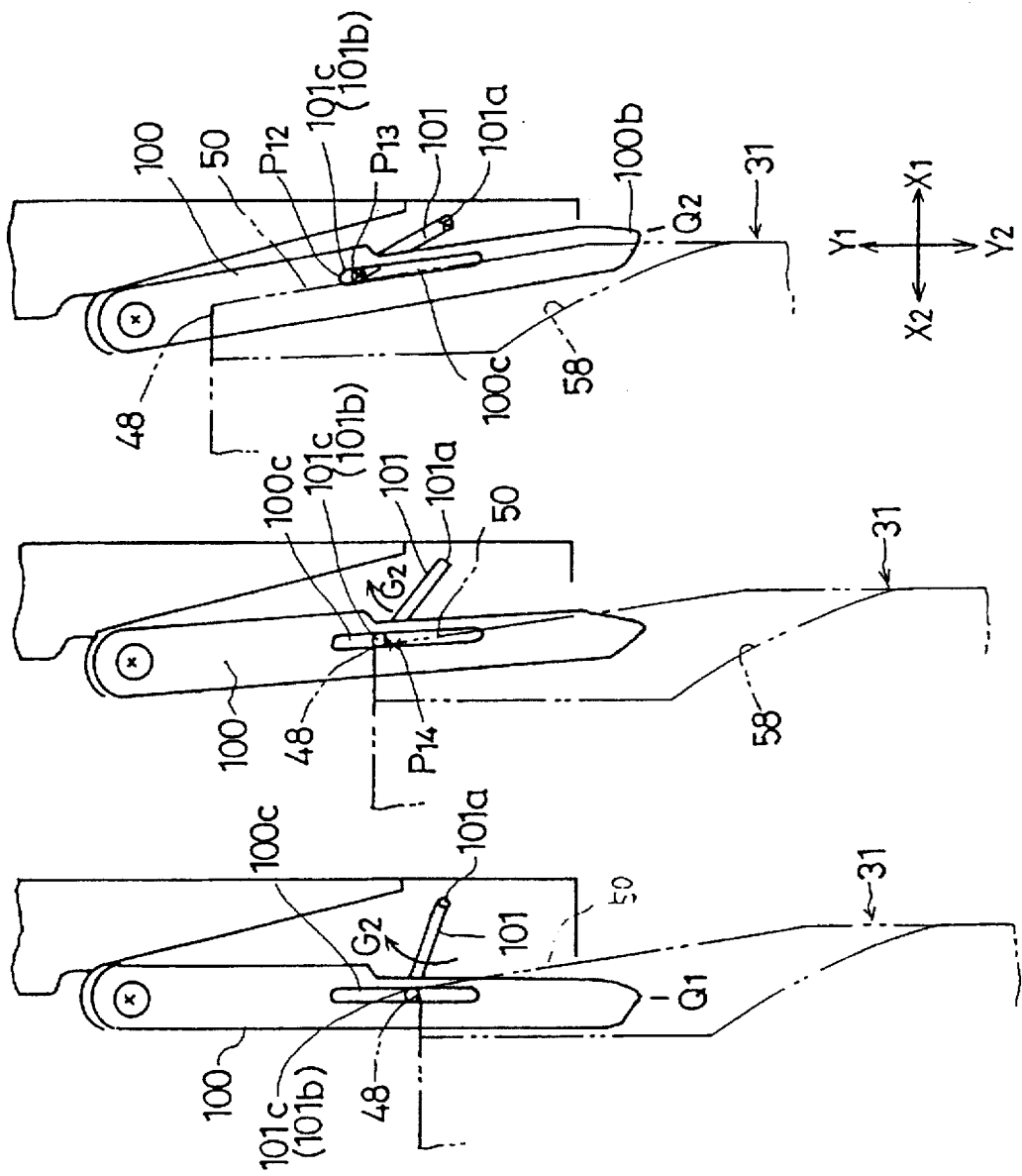
FIGS. 19A, 19B and 19C show an operation of the door opening mechanism of the tape recorder shown in FIG. 2 when the magnetic-tape cartridge is inserted in the tape recorder.

When the pressed portion 101c (upward arm portion 101b) of the crank arm 101 moves along the arc U in the G2 direction, the upward arm portion 101b presses an inner wall of the long hole 100c and thereby the door opening member 100 turns in the F1 direction (direction to a retreat position Q2, shown in FIG. 19C).

After the pressed portion 101c (upward arm portion 101b) passes through the point P11, when the pressed portion 101c has a force in the X1 direction applied thereto, the crank arm 101 can turn in the G2 direction.

A position P12 at the Y1-direction end of the long hole 100c is predetermined to be located in the Y1 direction further from a portion P13 (as shown in FIG. 19C) at which the pressed portion 101c (upward arm portion 101b) moving in the arc U reaches. Thereby, the crank arm 101 turns in the G2 direction without having the turning limited.

A door holding projection 107, shown in FIG. 8, downward projects from a top plate portion 123 (which will be described later), holds an opened door 45 and maintains the opened state of the door 45.

Structure of the Tape Driving Mechanism 94

Figure 7:
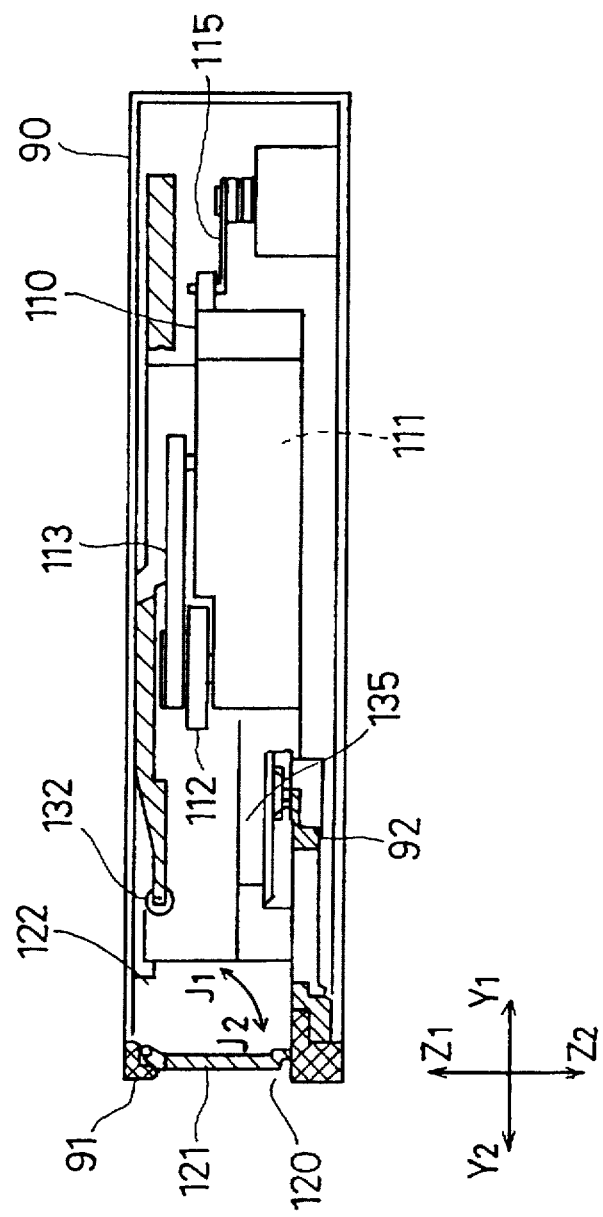
FIG. 7 shows an side elevational sectional view of the tape recorder shown in FIG. 2.

As shown in FIGS. 6 and 7, the tape driving mechanism 94 has a substrate 110, a motor 111 fixed on the substrate 110, a roller 112 supported on the substrate 110, and a belt 113. The substrate 110 is supported by a shaft 114 and has a force in an I1 direction applied thereto by a torsion coil spring 115. The roller 112 is located at a position such as to face the opening window 44 of the magnetic tape cartridge 31 being inserted into the tape recorder 30.

Structure of the Magnetic-Tape Cartridge Guiding Mechanism 96

Figure 8:
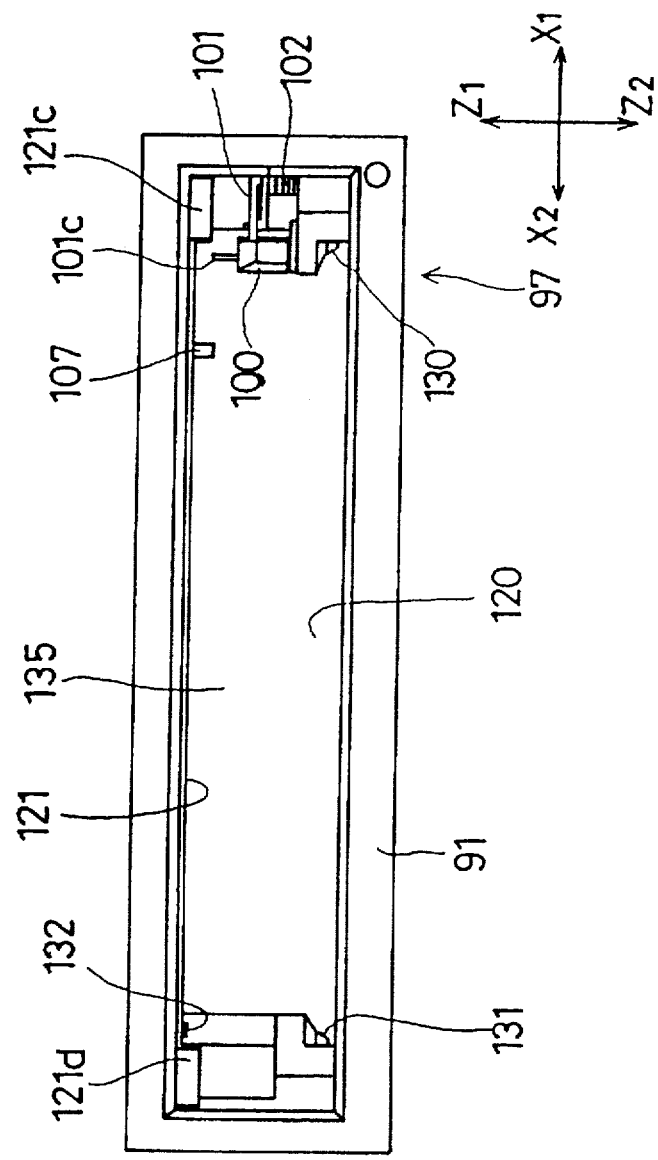
FIG. 8 shows a front view of the tape recorder shown in FIG. 2 in a condition where a flap thereof has been opened.
Figure 12:
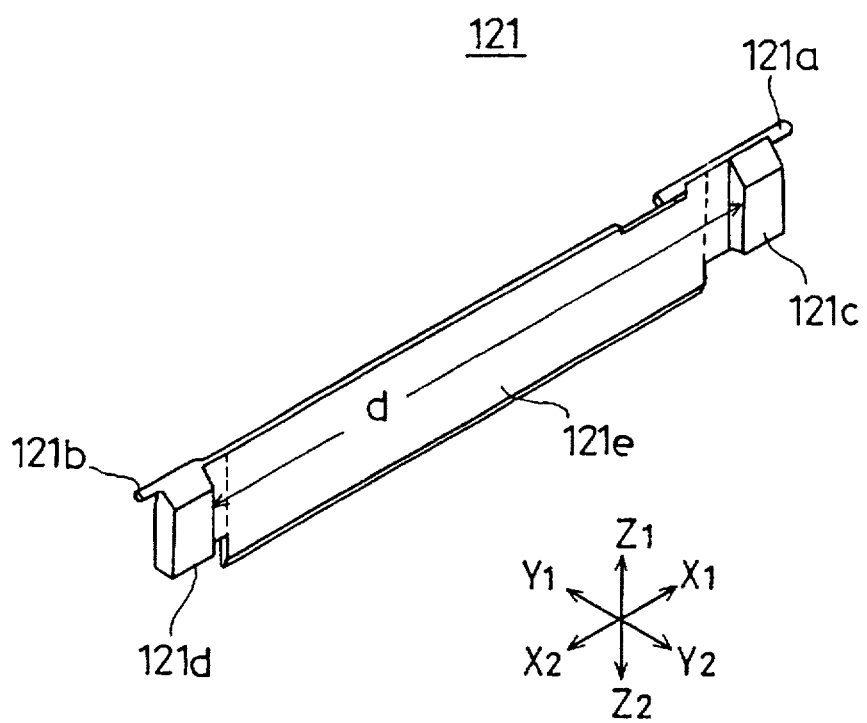
FIG. 12 shows a perspective view of the flap of the tape recorder shown in FIG. 2 when viewing the front side thereof.

With reference to FIGS. 7 and 8, the front bezel 91 has a magnetic-tape cartridge insertion opening 120. The front bezel 91 has a flap 121, shown in FIG. 12, rotatably supported in a J1-direction to the bezel 91, as a result of two side-shaft portions 121a and 121b of the flap 121 being supported at a top of the insertion opening 120. The flap 121 has a force in a J2 direction applied thereby by a torsion coil spring (not shown in the figures) and thereby covers the insertion opening 120 as shown in FIG. 7.

The flap 121 has, at two sides of a front surface thereof, guiding portions 121c and 121d. Each of the guiding portions 121c and 121d projects in the Y2 direction from a flap body 121e. A distance between the guiding portions 121c and 121d is substantially equal to and slightly larger than a distance d between the vertical inter-step surfaces 55 and 56 of the magnetic-tape cartridge 31 shown in FIG. 3.

Figure 9:
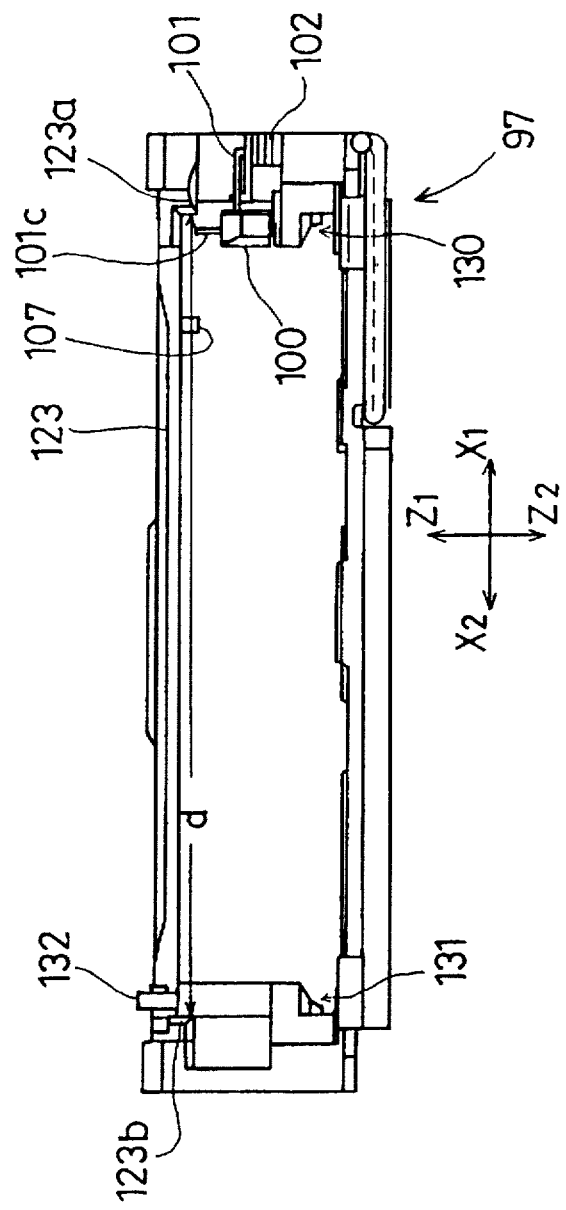
FIG. 9 shows a front view of the tape recorder shown in FIG. 2 in a condition where a front bezel thereof has been removed therefrom.

The tape recorder 30 has a flap receiving space 122 at the rear side of the front bezel, at the side of the top plate, for receiving the opened flap 121. The top plate portion 123 of the frame 92 extends in the Y1 direction subsequent to the flap receiving space 122. Guiding portions 123a and 123b are formed on the bottom surface of the top plate portion 123 at the two sides thereof, have the distance 'd' therebetween and extend in the Y1 direction, as shown in FIG. 9.

When the flap 121 is opened, the guiding portions 121c and 121d are located immediately behind of the front bezel 91. Further, in the state in which the flap 121 is opened, the guiding portion 121c is aligned with the guiding portion 123a, and also the guiding portion 121d is aligned with the guiding portion 123b.

The magnetic-tape cartridge positioning mechanism 97 will be described later.

Figure 13:
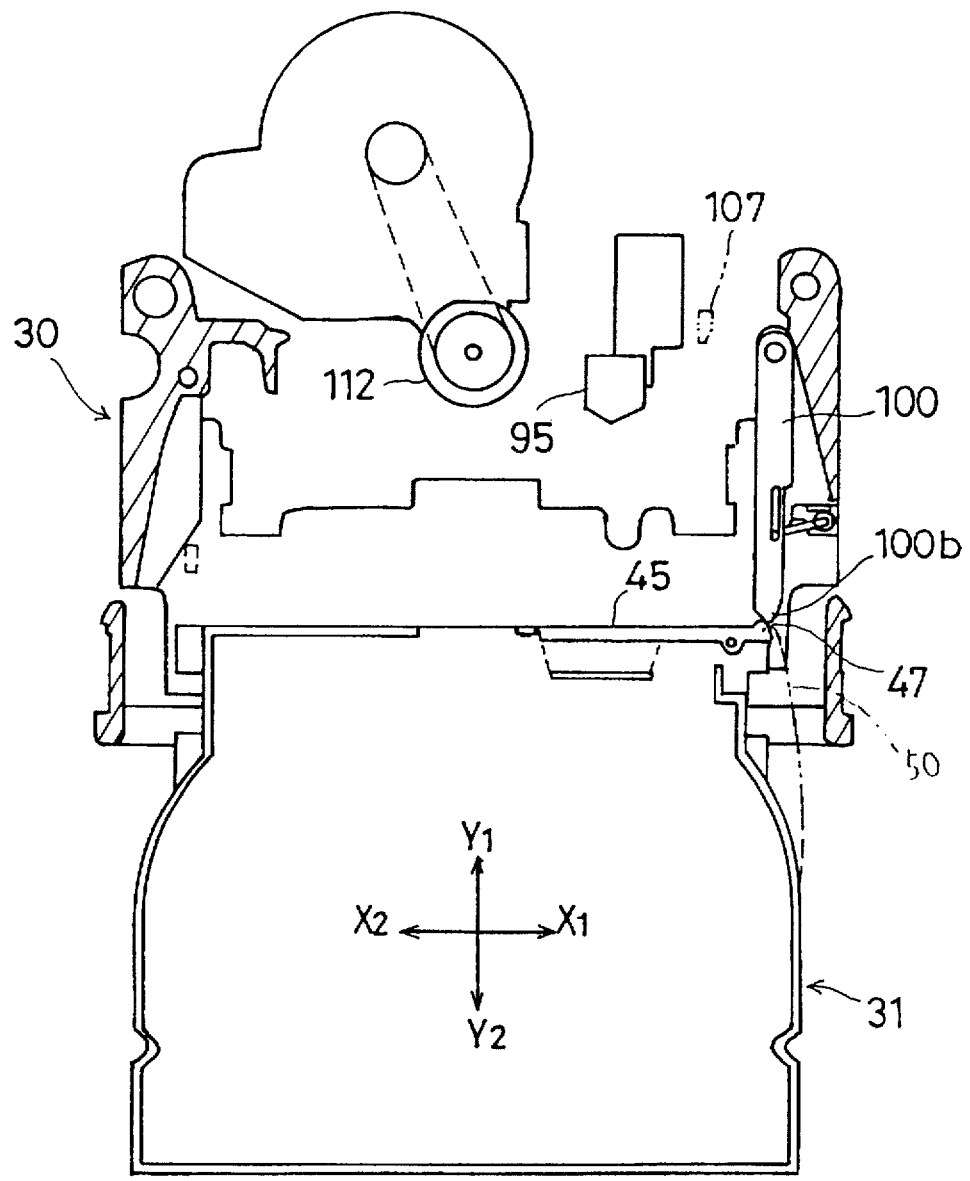
FIG. 13 shows a first step of a magnetic-tape cartridge inserting/loading process of the tape recorder shown in FIG. 2.
Figure 14:
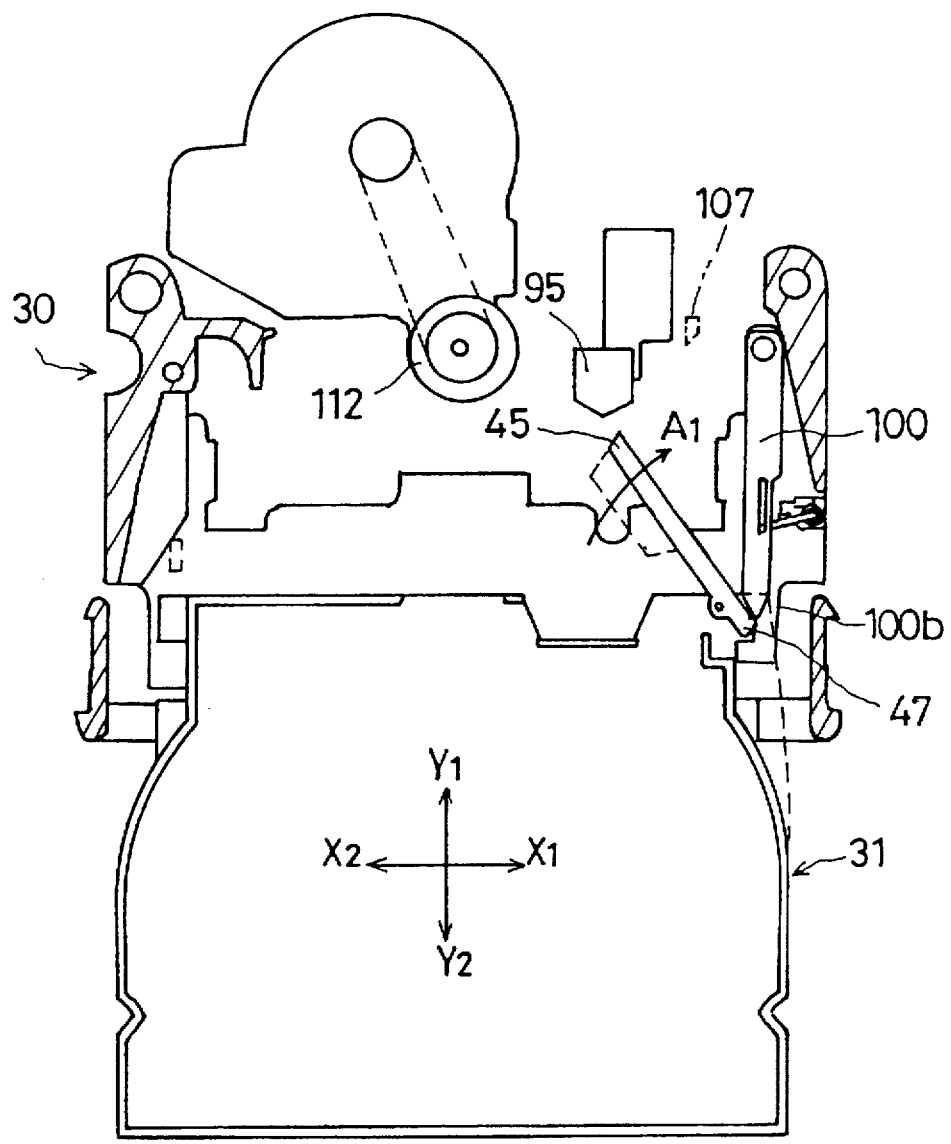
FIG. 14 shows a second step of a magnetic-tape cartridge inserting/loading process of the tape recorder shown in FIG. 2.
Figure 15:
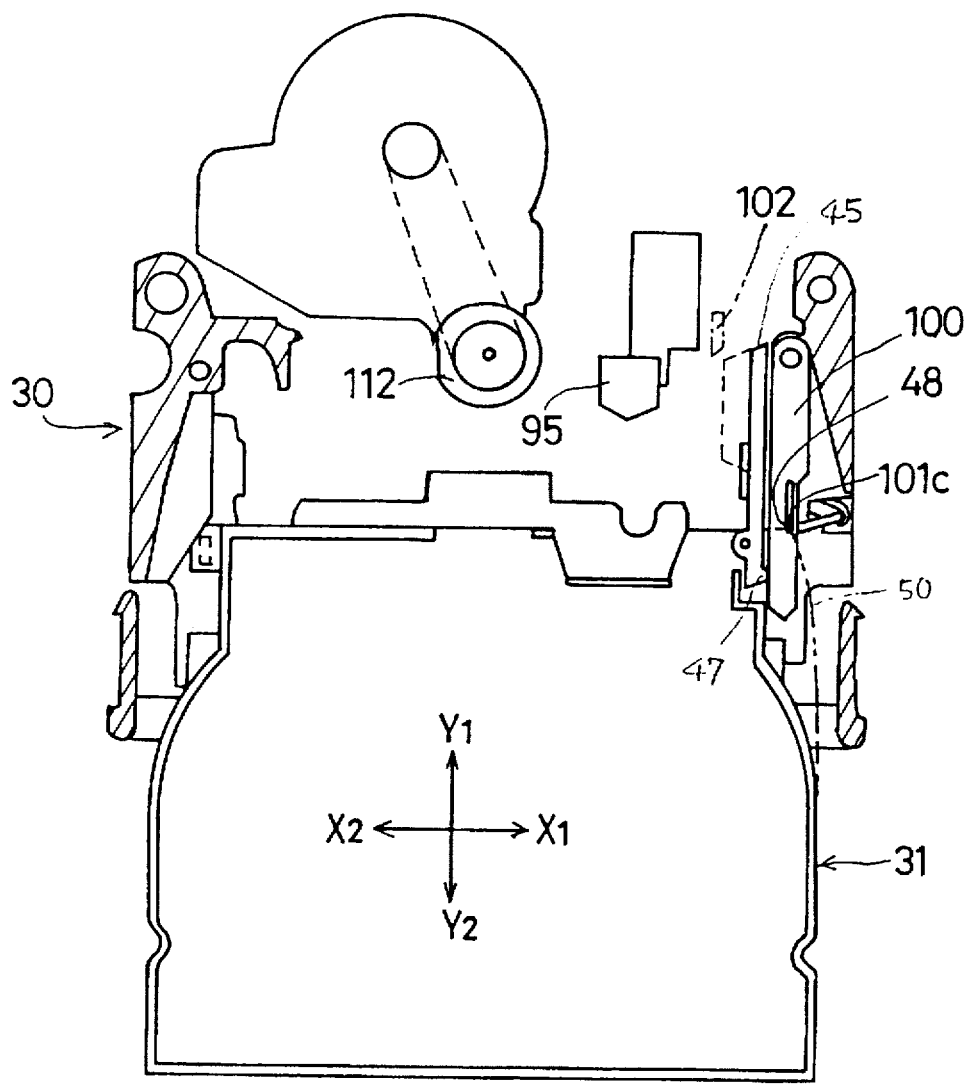
FIG. 15 shows a third step of a magnetic-tape cartridge inserting/loading process of the tape recorder shown in FIG. 2.
Figure 16:
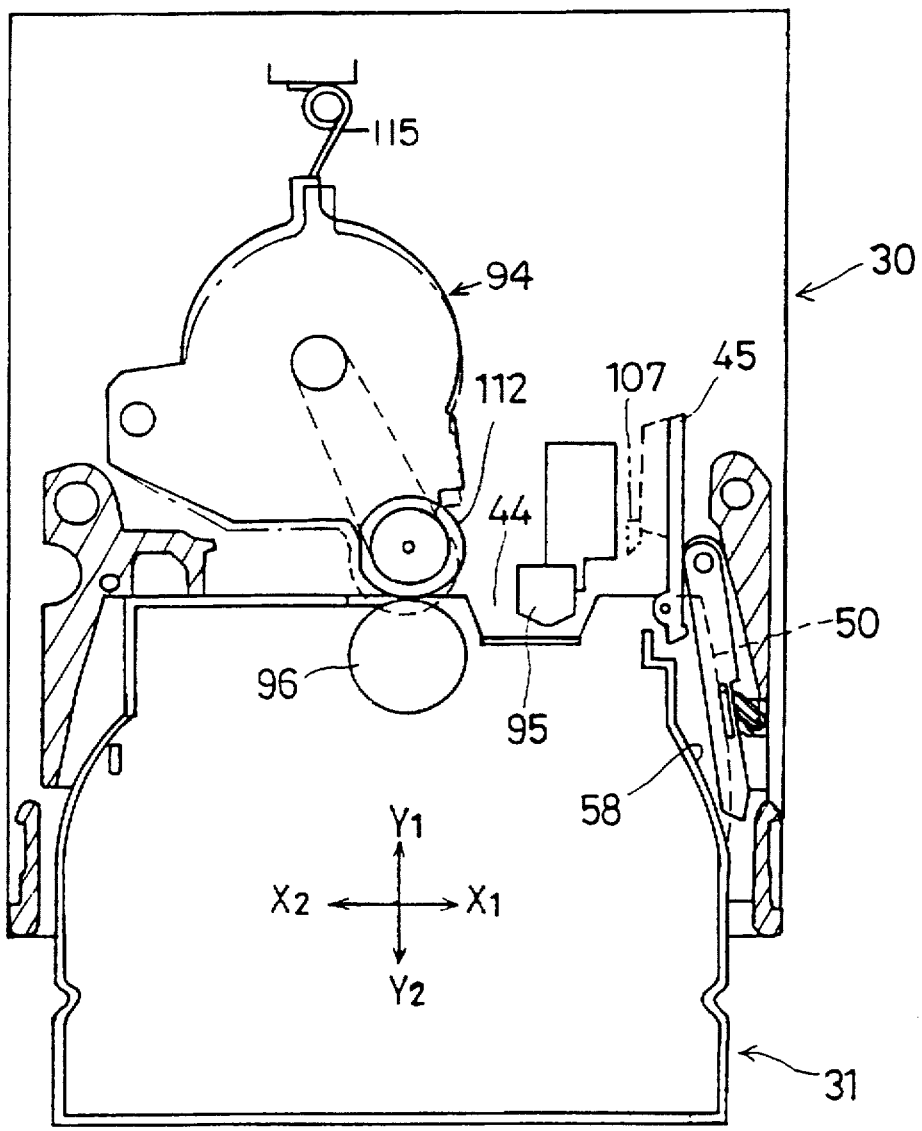
FIG. 16 shows an internal plan view of the tape recorder shown in FIG. 2 in a condition where the magnetic-tape cartridge has been loaded therein.
Figure 17:
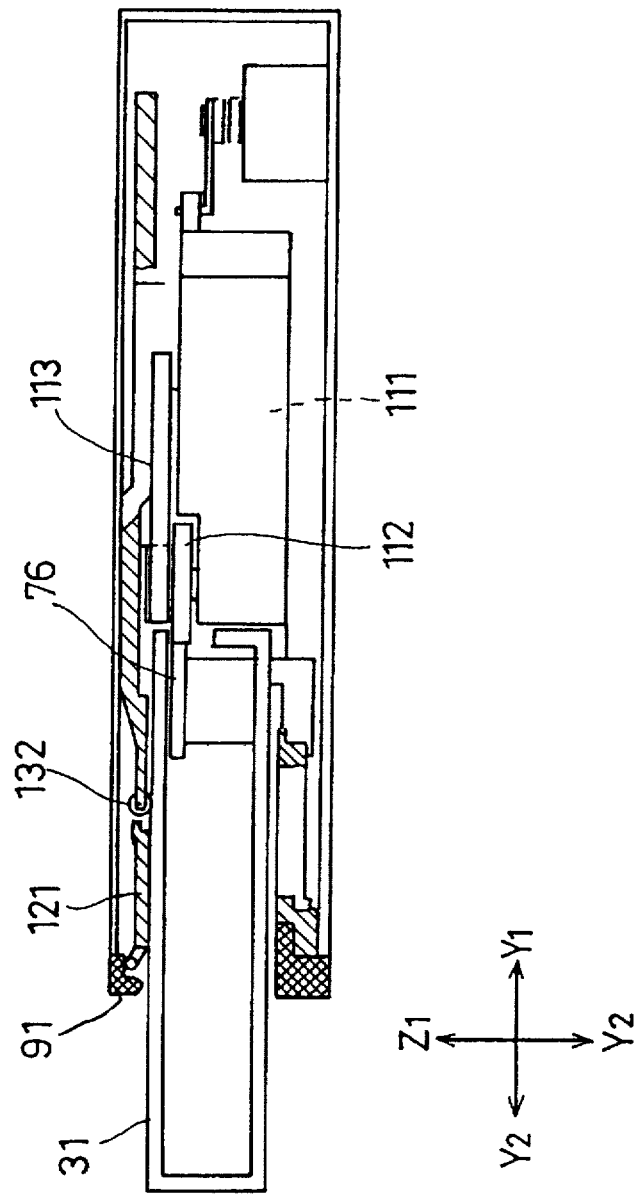
FIG. 17 shows an internal side elevational view of the tape recorder shown in FIG. 2 in the condition where the magnetic-tape cartridge has been loaded therein.

General Description of Loading of the Magnetic-Tape Cartridge 31, and Tape Driving The magnetic-tape cartridge 31 is inserted through the insertion opening 120 in the Y1 direction, is further inserted through states shown in FIGS. 13, 14 and 15, reaches a final position shown in FIGS. 16 and 17, and thus is loaded in the tape recorder 30 in a condition in which the door 45 is opened.

During this time, the magnetic head 95 enters the opening window 44 and comes into contact with the magnetic tape 41. Further, the roller 112 enters the opening window 43 and comes into contact with the roller 76. The roller 76 is rotated by the motor 111 via the belt 113 and the roller 112, and thereby, the magnetic tape 41 runs and information is recorded in the magnetic tape 41.

By drawing the magnetic-tape cartridge 31 in the Y2 direction, the magnetic-tape cartridge 31 can be removed from the tape recorder 30.

Operation of the Door Opening Mechanism 93

When the magnetic-tape cartridge 31 is inserted through the insertion opening 120 in the Y1 direction, first, as shown in FIG. 13, the arm portion 47 of the door 45 comes into contact with the edge portion 100b of the door opening member 100 which is in the operation position Q1.

When the magnetic-tape cartridge 31 is further inserted, as shown in FIGS. 14 and 15, the arm portion 47 of the door 45 is pressed by the edge portion 100b of the door opening member 100, and thereby the door 45 turns in the A1 direction against an elastic force of a spring (not shown in the figures), moves until the door 45 extends along the Y1 direction, as shown in FIG. 15, and thus is opened. This door 45 opening operation is performed at an initial step during the insertion of the magnetic-tape cartridge 31. As a result, the door 45 turns to be opened without coming into contact with the magnetic head 95. At this time, the door opening member 100 is maintained to be in the operation position Q1 by the crank arm 101 and so forth. Thereby, the door opening member 100 is prevented from escaping in the X1 direction and the door 45 opening operation can be performed stably.

At this time, the edge portion 100b of the door opening member 100 enters a space between the extending portion 50 and the lug 61 located at the side of the magnetic-tape cartridge 31 shown in FIG. 3.

When the magnetic-tape cartridge is further inserted, as shown in FIGS. 15 and 19A, the pressing portion 48 shown in FIG. 3 of the magnetic-tape cartridge 31 comes into contact with and then presses in the Y1 direction the pressed portion 101c of the crank arm 101. Thereby, the crank arm 101 turns in the G2 direction against a force of the spring 102. The pressing portion 48 of the magnetic-tape cartridge 31 presses the pressed portion 101c (upward arm portion 101b) of the crank arm 101 until the pressed portion 101c reaches the position P4 after passing through the point P11 shown in FIG. 11. When the pressed portion 101c passes through the point P11, the crank arm 101 is in a condition in which the crank arm 101 can turn also if the X1-direction force is applied to the pressed portion 101c.

Further, when the pressed portion 101c passes through the point P11, the pressed portion 101c moves in the X1 direction as shown in FIG. 11. Thereby, when the magnetic-tape cartridge 31 is further inserted, as shown in FIG. 19B, the pressed portion 101c is disengaged from the pressing portion 48 of the magnetic-tape cartridge 31. As a result, the pressed portion 101c then comes into contact with the extending portion 50 of the magnetic-tape cartridge 31.

Then, the magnetic-tape cartridge 31 is further inserted and thus reaches the final position shown in FIG. 16. In this process, the extending portion 50, subsequent to the pressing portion 48, of the magnetic-tape cartridge 31 thus comes into contact with the pressed portion 101c of the crank arm 101, and presses the pressed portion 101c in the X1 direction. Thereby, as shown in FIG. 19C, the crank arm 101 is further rotated against the force of the spring 102 in the G2 direction, the upward arm portion 101b of the crank arm 101 presses an inner wall of the long hole 100c, and thereby the door opening member 100 is rotated in the F1 direction to be in the retreat position Q2. Thus, the door opening member 100 retreats into the position such that the insertion of the magnetic-tape cartridge 31 is not disturbed by the door opening member 100. As a result, the magnetic-tape cartridge 31 is smoothly inserted to the final position without coming into contact with the door opening member 100.

As a result of the door opening member 100 turning in the F1 direction, the once-opened door 45 tends to close. However, as shown in FIG. 16, the door holding projection 107, also shown in FIG. 8, comes into contact with the door 45 and maintains the opened state of the door 45.

When the magnetic-tape cartridge 31 is drawn out from the tape recorder 30, the door opening mechanism 93 operates in an order reverse to the order in which the magnetic-tape cartridge 31 is loaded, and also in reverse directions. Thereby, the magnetic-tape cartridge 31 is taken out in a state in which the door 45 has closed.

Operation of the Magnetic-Tape Cartridge Guiding Mechanism

When the magnetic-tape cartridge 31 is inserted through the insertion opening 120 in the Y1 direction, first, as shown in FIGS. 17 and 13, the flap 121 is pressed and thus opened. When the flap 121 is opened, the guiding portions 121c and 121d extend in the Y1 direction, thereby can guide the two side inter-step surfaces 55 and 56 of the magnetic-tape cartridge 31, respectively, and thus guide the insertion of the magnetic-tape cartridge 31. The flap 121 is supported by the front bezel 91 at the two sides and thus is not likely to shake. Thereby, the guiding portions 121c and 121d are not likely to shake and thus function appropriately as guiding means.

As a result, the insertion of the magnetic-tape cartridge 31 is thus guided as the inter-step surfaces 55 and 56 are guided by the guiding portions 121c and 121d, respectively, immediately after the insertion has started. Thus, the position of the magnetic-tape cartridge 31 in the X1 and X2 directions is appropriately controlled and the insertion direction thereof is controlled to be the Y1 direction. Thereby, neither position deviation nor direction deviation occurs and the inter-step surfaces 55 and 56 go rightly toward the guiding portions 123a and 123b. As a result, guiding by the guiding portion 123a and 123b is properly started.

Figure 18:
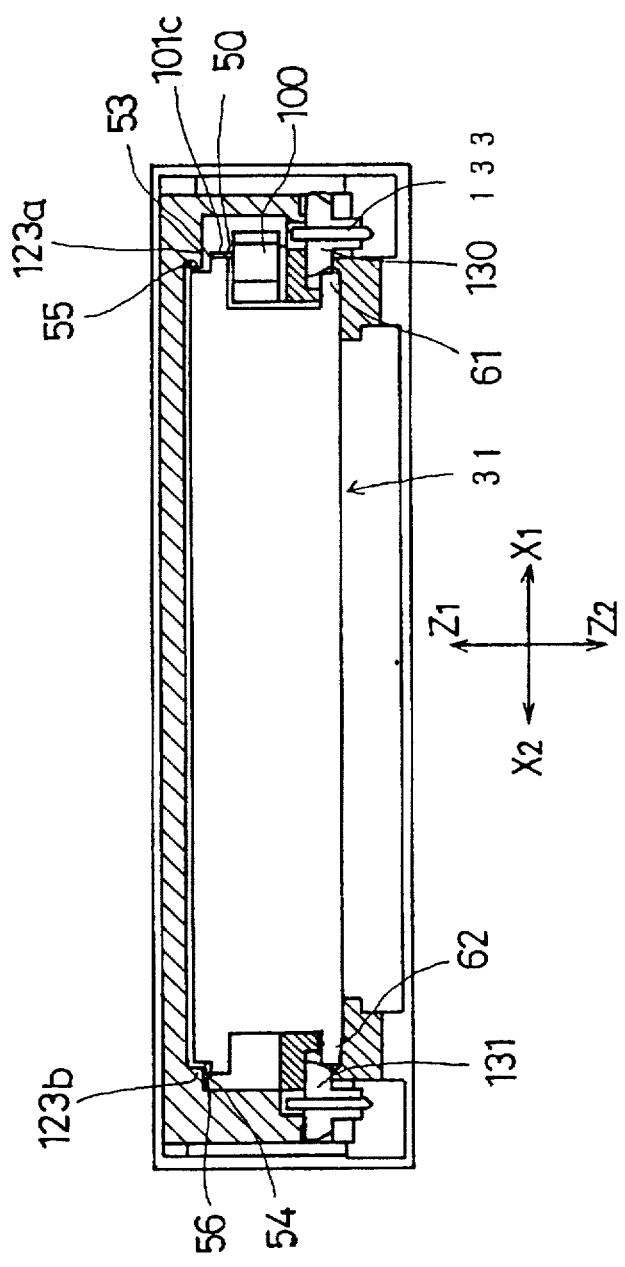
FIG. 18 shows an internal front view of the tape recorder shown in FIG. 2 in the condition where the magnetic-tape cartridge has been loaded therein.

When the magnetic-tape cartridge 31 is further inserted, as shown in FIG. 18, the inter-step surfaces 55 and 56 are then guided by the guiding portions 123a and 123b. Thus, the position of the magnetic-tape cartridge 31 in the X1 and X2 directions is appropriately controlled and the insertion direction thereof is controlled to be the Y1 direction, until the magnetic-tape cartridge 31 reaches the final position. Thus, the magnetic-tape cartridge 31 is properly loaded.

Structure and Operation of the Magnetic-Tape Cartridge Positioning Mechanism 97

Figure 20:
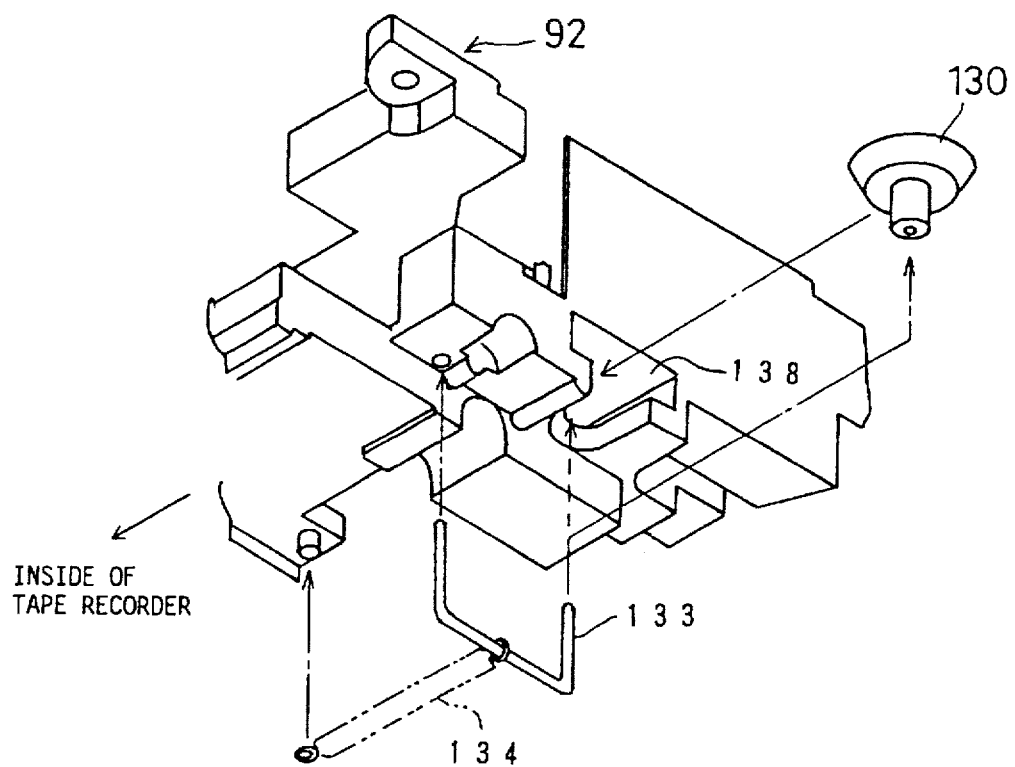
FIG. 20 shows a pressing roller attachment portion of the tape recorder shown in FIG. 2.
Figure 21:
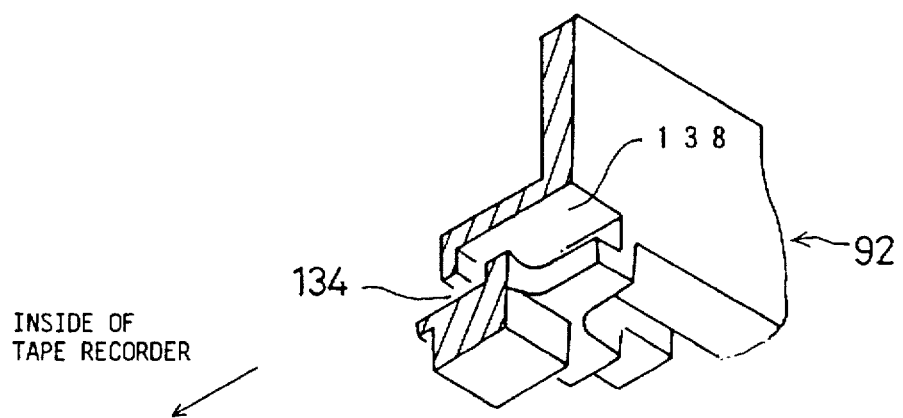
FIG. 21 shows a part of the pressing roller attachment portion after a part thereof is cut off along a vertical plane passing through the center of a roller fitting hole.

The magnetic-tape cartridge positioning mechanism 97 has three pressing rollers 130, 131 and 132 shown in FIGS. 9 and 20.

As shown in FIG. 20, the pressing roller 130 has a tapering shape such that a diameter thereof increases as a position thereof rises, is rotatably supported by a U-shaped arm 133, is inserted into a roller fitting hole 138 of the frame 92, and thus is attached in the frame 92. Thus, a part of the roller 130 projects inside the tape recorder 30, as shown in FIG. 9, and a spring 134 applies to the roller 130 a force via the U-shaped arm 133 toward the inside of the tape recorder 30, thus in the roller 130 projecting direction. As shown in FIG. 8, the roller 130 projects at the X1-direction end, at a lower position in a magnetic-tape cartridge loading space 135. The second roller 131 has the same shape as the roller 130 and is attached in the frame 92 similarly to the case where the roller 130 is attached in the frame 92. The roller 131 projects at the X2-direction end, at the lower position in the magnetic-tape cartridge loading space 135.

As shown in FIGS. 7 and 9, the third roller 132 is attached in the top plate portion 123 of the frame 92, and has a force thereon by a spring in a Z2 direction. This roller 132, as shown in FIG. 8, projects at the X2-direction end from the top plate portion 123.

The magnetic-tape cartridge 31 is inserted into the tape recorder 30 as the magnetic-tape cartridge 31 slightly outward presses the three pressing rollers 130, 131 and 132. Then, as shown in FIGS. 17 and 18, the left and right lugs 61 and 62 of the magnetic-tape cartridge 31 are downwardly pressed by the pressing rollers 130 and 131 as shown in FIG. 18. Further, the top plate 52 of the magnetic-tape cartridge 31 is downwardly pressed by the pressing roller 132 as shown in FIG. 17. Thus, the magnetic-tape cartridge 31 is positioned in the tape recorder 30.

The pressing rollers 130 and 132 are located at a height within the magnetic-tape cartridge loading space 135. Thereby, in comparison to a case where such pressing rollers are provided at a height below the magnetic-tape cartridge loading space 135, it is possible to thin the tape recorder 30.

Figure 1:
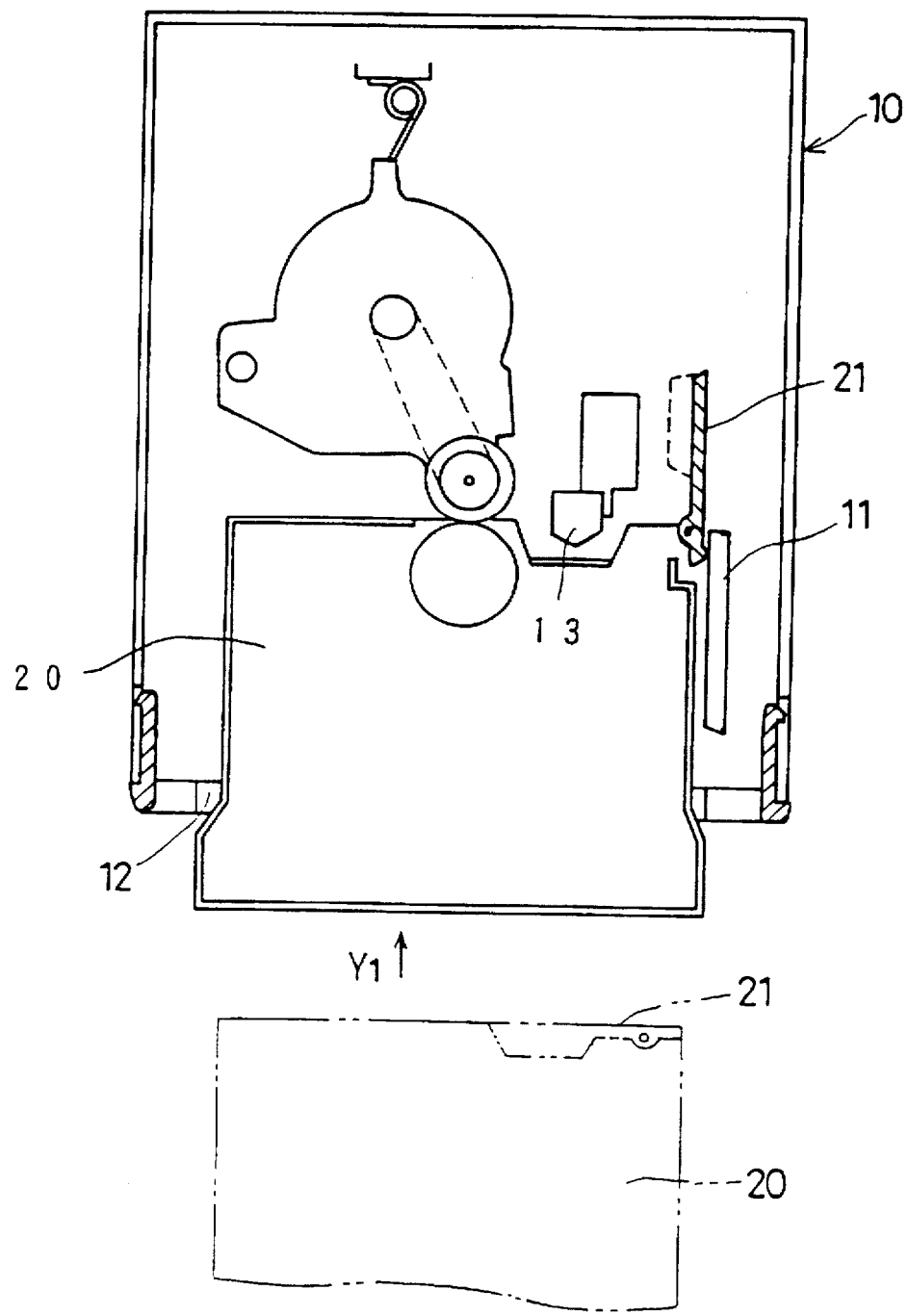
FIG. 1 shows an example of a recording-medium cartridge loading device in the related art.

Further, a magnetic-tape cartridge which can be loaded in the above-described tape recorder 30 is not limited to the magnetic-tape cartridge 31 having the extending portions 50 and 51. Another magnetic-tape cartridge not having the extending portions 50 and 51 can be loaded in the tape recorder 30. In fact, the magnetic-tape cartridge 20 shown in FIG. 1 does not have the extending portions 50 and 51 and also does not have two side projecting portions shown in FIG. 5 which start from the side walls 58, 59 and extend in the Y2 direction. Thus, the cartridge 20 does not have portions which come into contact with the door opening member 100 and obstruct the insertion of the cartridge 20. Accordingly, it is not necessary that the door opening member 100 retreat in the X1 direction as shown in FIG. 19C. Therefore, when the cartridge 20 shown in FIG. 1 is inserted into the tape recorder 30, the door opening member 100 is maintained in the operation position Q1 and the cartridge 20 can be inserted smoothly to the final position.

Further, the present invention is not limited to the above-described embodiments, and variations and modifications may be made without departing from the scope of the present invention.

What is claimed is:

1. A recording-medium cartridge loading device, for a recording-medium cartridge having a door to be loaded therein, comprising:

a door opening member for opening said door of said recording-medium cartridge by an action of said recording-medium cartridge being inserted into an insertion position; and maintaining and retreating means for maintaining said door opening member in an operation position in a first step of an insertion action of said recording-medium cartridge into said insertion position when said door opening member is opening said door of said recording-medium cartridge, said maintaining and retreating means allowing said door opening member to retreat from said operation position in another step of the insertion action of said recording-medium cartridge into said insertion position after said opening member has opened said door of said recording-medium cartridge.

2. A recording-medium cartridge loading device, for a recording-medium cartridge having a door to be loaded therein, comprising:

a door opening member for automatically opening said door of said recording-medium cartridge by an action of said recording-medium cartridge being inserted into an insertion position; and maintaining and retreating means for maintaining said door opening member in said operation position when said door opening member opens said door of said recording-medium cartridge, said maintaining and retreating means allowing said door opening member to retreat from said operation position after said door opening member has opened said door of said recording-medium cartridge, and wherein;

said maintaining and retreating means has a pressed member which is pressed by a predetermined portion of said recording-medium cartridge when said recording-medium cartridge is inserted in said loading device, such that said predetermined portion of said recording-medium cartridge presses said pressed member so that said door opening member retreats from said operation position.

3. A recording-medium cartridge loading device, for a recording-medium cartridge having a door to be loaded therein, comprising:

a door opening member for automatically opening said door of said recording-medium cartridge by an action of said recording-medium cartridge being inserted into an insertion position; and maintaining and retreating means for maintaining said door opening member in said operation position when said door opening member opens said door of said recording-medium cartridge, said maintaining and retreating means allowing said door opening member to retreat from said operation position after said door opening member has opened said door of said recording-medium cartridge, and wherein;

said maintaining and retreating means has a bearing member for bearing a load occurring when said door opening member opens said door of said recording-medium cartridge, said bearing member being pressed by a predetermined portion of said recording-medium cartridge after said door opening member has opened and thereby allowing said door opening member to retreat from said operation position.

* * * * *